(12) United States Patent
Siciliani et al.

(10) Patent No.: US 11,163,572 B2
(45) Date of Patent: Nov. 2, 2021

(54) MEMORY SYSTEMS AND MEMORY CONTROL METHODS

(71) Applicant: Micron Technology, Inc., Boise, ID (US)

(72) Inventors: Umberto Siciliani, Rubano (IT); Tommaso Vali, Sezze (IT); Walter Di-Francesco, Silvi (IT); Violante Moschiano, Avezzano (IT); Andrea Smaniotto, Albignasego (IT)

(73) Assignee: Micron Technology, Inc., Boise, ID (US)

( * ) Notice: Subject to any disclaimer, the term of this patent is extended or adjusted under 35 U.S.C. 154(b) by 1074 days.

(21) Appl. No.: 14/172,806

(22) Filed: Feb. 4, 2014

(65) Prior Publication Data

US 2015/0220344 A1    Aug. 6, 2015

(51) Int. Cl.
*G06F 9/32* (2018.01)

(52) U.S. Cl.
CPC .............. *G06F 9/328* (2013.01); *G06F 9/321* (2013.01)

(58) Field of Classification Search
CPC ......... G06F 9/3804; G06F 9/328; G06F 9/321
See application file for complete search history.

(56) References Cited

U.S. PATENT DOCUMENTS

| | | |
|---|---|---|
| 6,009,453 A | 12/1999 | Sakaki |
| 7,039,841 B2 | 5/2006 | Cullen et al. |
| 7,069,377 B2 | 6/2006 | Roohparvar |
| 7,127,718 B1 | 10/2006 | Gavlik et al. |
| 7,395,419 B1 * | 7/2008 | Gonion ............... G06F 8/443 712/241 |

(Continued)

FOREIGN PATENT DOCUMENTS

| | | |
|---|---|---|
| CN | 1584840 | 2/2005 |
| CN | 1653345 | 8/2005 |

OTHER PUBLICATIONS

TW TW 104103609 Search Rept Trans, dated Jan. 26, 2016, Micron Technology, Inc.

(Continued)

*Primary Examiner* — William B Partridge
(74) *Attorney, Agent, or Firm* — Wells St. John P.S.

(57) ABSTRACT

Memory systems and memory control methods are described. According to one aspect, a memory system includes a plurality of memory cells individually configured to store data, program memory configured to store a plurality of first executable instructions which are ordered according to a first instruction sequence and a plurality of second executable instructions which are ordered according to a second instruction sequence, substitution circuitry configured to replace one of the first executable instructions with a substitute executable instruction, and a control unit configured to execute the first and second executable instructions to control reading and writing of the data with respect to the memory, wherein the control unit is configured to execute the first executable instructions according to the first instruction sequence, to execute the substitute executable instruction after the execution of the first executable instructions, and to execute the second executable instructions according to the second instruction sequence as a result of execution of the substitute executable instruction.

36 Claims, 3 Drawing Sheets

(56) References Cited

U.S. PATENT DOCUMENTS

| | | | |
|---|---|---|---|
| 7,411,848 B2 | 8/2008 | Gatzemeier et al. | |
| 7,587,560 B2 | 9/2009 | De Santis et al. | |
| 2002/0124161 A1* | 9/2002 | Moyer | G06F 8/66 |
| | | | 712/234 |
| 2004/0059437 A1 | 3/2004 | Cullen et al. | |
| 2004/0181793 A1* | 9/2004 | Sakamoto | G06F 9/4812 |
| | | | 718/102 |
| 2005/0028159 A1 | 2/2005 | Kodama et al. | |
| 2005/0071605 A1* | 3/2005 | Hsieh | G06F 8/66 |
| | | | 712/226 |
| 2005/0265317 A1* | 12/2005 | Reeves | H04L 29/12066 |
| | | | 370/235 |
| 2008/0154804 A1* | 6/2008 | Dawson | G06F 11/3409 |
| | | | 706/8 |
| 2008/0263115 A1* | 10/2008 | Morad | G06F 9/30014 |
| | | | 708/230 |
| 2009/0019262 A1* | 1/2009 | Tashiro | G06F 9/3016 |
| | | | 712/208 |
| 2009/0276777 A1 | 11/2009 | Brown et al. | |
| 2010/0157693 A1* | 6/2010 | Iwai | G11C 5/143 |
| | | | 365/189.09 |
| 2010/0325402 A1* | 12/2010 | Vauclair | G06F 9/32 |
| | | | 712/230 |

OTHER PUBLICATIONS

WO PCT/US2016/012735 Search Rept., dated Apr. 10, 2015, Micron Technology, Inc.
WO PCT/US2015/012735 Writt. Opin., dated Apr. 10, 2015, Micron Technology, Inc.
Wikipedia, "Execute in Place", online http://en.wikipedia.org/wiki/Execute_in_place, Nov. 7, 2013, 2 pages.
Wikipedia, "Instructions Set", online http://en.wikipedia.org/wiki/Instruction_(computer_science), Nov. 26, 2013, 9 pages.
WO PCT/2015/012735 IPRP, dated Aug. 9, 2016, Micron Technology, Inc.
TW TW 104103609 SR Translation, dated Jun. 2, 2016, Micron Technology, Inc.

* cited by examiner

MEMORY SYSTEMS AND MEMORY CONTROL METHODS

TECHNICAL FIELD

Embodiments disclosed herein pertain to memory systems and memory control methods.

BACKGROUND

Memory devices are widely used in electronic devices, such as computers, digital cameras, personal audio and video players, appliances, vehicles, etc., for storing digital information. Many different types of memory are available, using different fundamental technologies for storing data.

Memory cells of memory are programmed to have different states to store the digital information. Program signals may be applied to the memory cells to change the memory cells from one memory state to another different memory state. The memory states of the memory cells may be subsequently read to access the stored digital information.

Controllers which execute programming may be utilized to control operations with respect to memory. However, the programming is often hard-coded as firmware into a memory device and changes to the hard-coded firmware may involve an expensive and time-consuming process.

At least some example embodiments discussed herein are directed towards memory systems and memory control methods, and more specific example embodiments facilitate modifications and/or additions to executable code of the memory systems as described in detail below.

DETAILED DESCRIPTION OF EXAMPLE EMBODIMENTS

Figure 1:
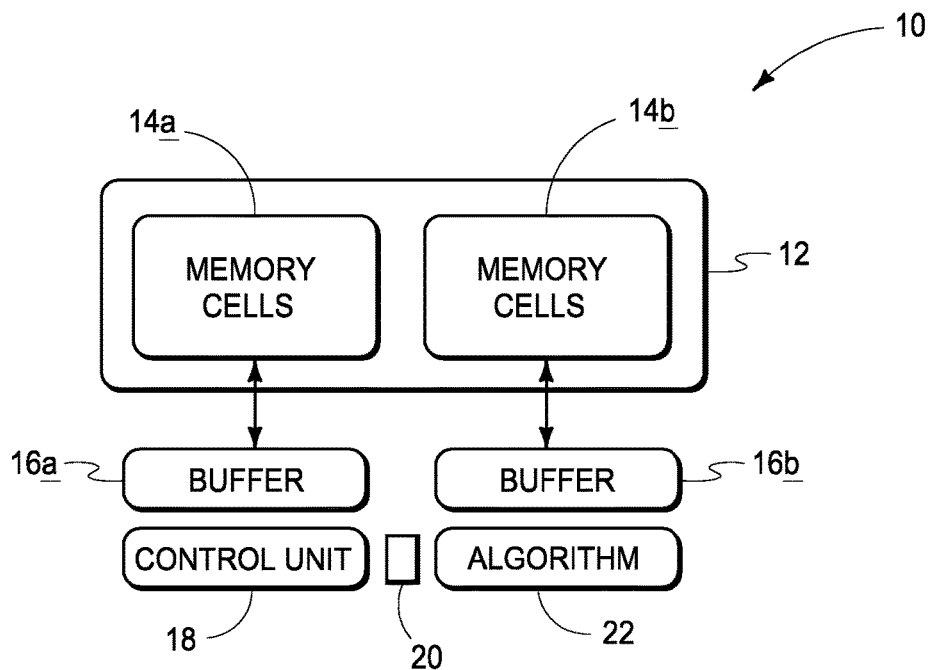
FIG. 1 is a functional block diagram of a memory system according to one embodiment.
Figure 2:
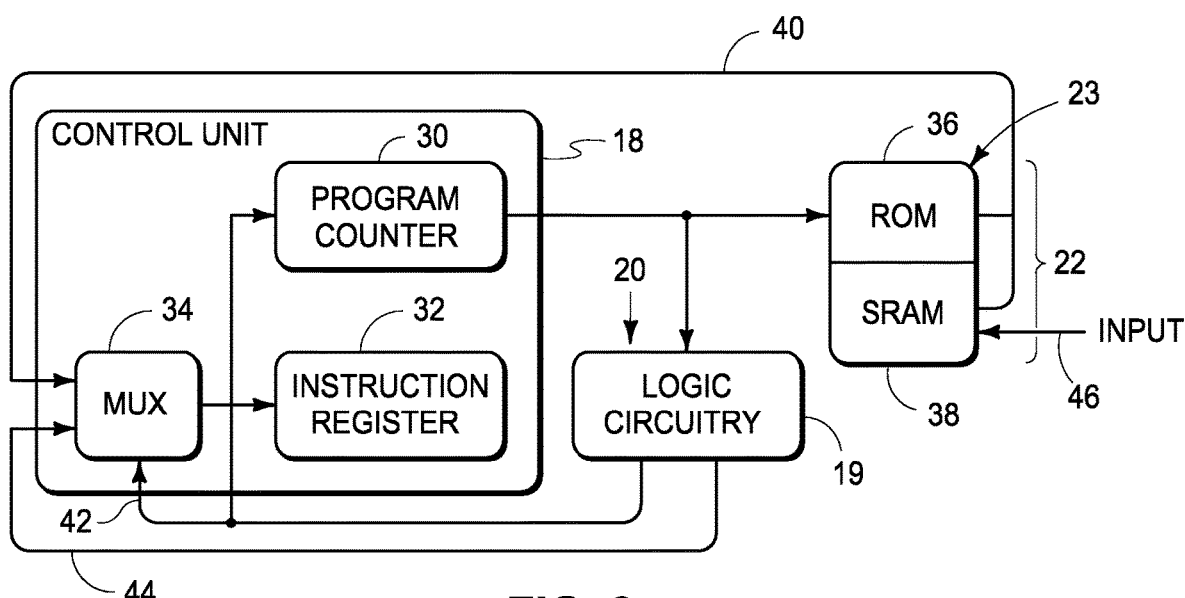
FIG. 2 is a functional block diagram which illustrates additional details of a control unit and program memory according to one embodiment.

Referring to FIG. 1, a functional block diagram of a memory system 10 is shown according to one embodiment. The illustrated embodiment of memory system 10 includes main memory 12, a plurality of buffers 16a, 16b, a control unit 18, substitution circuitry 20 and an algorithm 22 which is stored in program memory (an example embodiment of program memory is shown in FIG. 2). Other embodiments of memory system 10 may include more, less and/or alternative components or circuitry.

Memory system 10 may be implemented within or with respect to various associated devices (not shown), such as computers, cameras, media players, and thumb drives, in some illustrative examples. Memory system 10 stores data generated or utilized by the associated devices in the described examples.

Main memory 12 includes a plurality of arrays of memory cells 14a, 14b configured to store data, conductors electrically connected with the memory cells 14a, 14b, and additional circuitry, for example circuits of access circuitry (not shown) which may include drivers and sense amplifiers to implement write and read operations with respect to main memory 12. At least some of the memory cells 14a, 14b are individually capable of being programmed to a plurality of different memory states at a plurality of moments in time. Main memory 12 is accessible to the user and/or associated device for storage of digital information. One more specific example of main memory 12 is NAND flash memory although the apparatus and methods of the described example embodiments may be utilized with other memory architectures in other embodiments.

Main memory 12 may be implemented in different arrangements in different embodiments. For example, the main memory 12 may be implemented within a memory device, such as a chip, a portion of the chip or other arrangements. The memory device may also include other circuitry and components of FIG. 1 or portions thereof.

Buffers 16a, 16b include a plurality of latches which temporarily store data being written to or accessed from main memory 12 in one embodiment. The illustrated example memory system 10 includes two planes individually including one of the arrays of memory cells 14a, 14b and a corresponding one of the buffers 16a, 16b.

Control unit 18 controls operations of writing, reading and re-writing data of main memory 12 as well as interfacing with other components or circuitry, such as sources of data to be stored within main memory 12. Control unit 18 may access and execute executable instructions and generate commands with respect to main memory 12 during operations of an associated device. Example commands instruct the generation of program signals and read signals which are applied to main memory 12 in one embodiment. The program signals are used to write data to main memory 12 (i.e., program the memory) during programming operations and the read signals are used to access or sense the contents of the data stored in main memory 12 in one embodiment.

In one embodiment, control unit 18 comprises processing circuitry configured to execute programming (i.e., algorithm 22) stored within computer-readable storage media (e.g., program memory 23 of FIG. 2) in at least one embodiment. For example, the control unit 18 may be implemented as one or more processor(s) and/or other structure configured to execute executable instructions including, for example, software and/or firmware instructions.

Substitution circuitry 20 is configured to implement operations with respect to algorithm 22 as described further below. For example, substitution circuitry 20 may be configured to implement testing and debugging operations during execution of algorithm 22 as well as implementing operations with respect to modifying and updating algorithm 22.

Algorithm 22 is a sequence of procedures to perform read and write operations with respect to main memory 12. In one more specific embodiment described in detail below, one portion of algorithm 22 is hard-coded within non-volatile memory (e.g., read only memory or ROM) and another portion of algorithm 22 is provided to update or modify the hard-coded portion of the algorithm 22 and which may be stored within volatile memory (e.g., static random access memory or SRAM). For example, the updated portion of algorithm 22 stored in volatile memory may be used for debugging to validate fixes to the hard-coded portion of algorithm 22 as well as for testing of new sequences and for user flow to add fixes and advanced or newly-developed features not present within the hard-coded portion of algorithm 22.

Referring to FIG. 2, additional details regarding fetching and execution of algorithm 22 by control unit 18 are described according to one embodiment.

Algorithm 22 is stored within a program memory 23 including a first storage space comprising read only memory (ROM) 36 and a second storage space comprising static random access memory (SRAM) 38 in one embodiment. An initial portion of algorithm 22 is hard-coded within ROM 36 during manufacture and production of the memory system 10 in one embodiment. Another portion of algorithm 22 may be stored in SRAM 38 during manufacture or production of the memory system 10 or subsequently thereafter. The portion of algorithm 22 stored in SRAM 38 may include new code added after the memory system 10 has been fabricated and perhaps used or implemented within an associated device. In some embodiments, the executable instructions of SRAM 38 may be marked with FW tags to distinguish the new executable code of SRAM 38 from the executable code of ROM 36.

In one embodiment, the portion of algorithm 22 stored in ROM 36 includes a plurality of executable instructions (e.g., operation code) which are ordered, accessed and executed according to a first instruction sequence. The executable instructions of ROM 36 may be referred to as first executable instructions and are stored in order in a plurality of sequential addresses of ROM 36 in one embodiment.

Similarly, the portion of algorithm 22 stored in SRAM 38 includes a plurality of executable instructions which are ordered, accessed and executed according to a second instruction sequence in one embodiment. The executable instructions of SRAM 38 may be referred to as second executable instructions and are stored in order in a plurality of sequential addresses of SRAM 38. In one example, the executable instructions of ROM 36 and SRAM 38 are stored in a continuous instruction set address space of ROM 36 and SRAM 38. SRAM 38 may be considered as an extension of the ROM 36 providing increased flexibility and replacement capability with respect to the algorithm 22.

During execution of the executable instructions, the first executable instruction of the first or second instruction sequence is fetched and executed, followed by the second executable instruction of the respective first or second instruction sequence and so on. In one more specific example, the executable instructions of the first instruction sequence stored in ROM 36 are executed in order until an appropriate time when the executable instructions of the second instruction sequence stored in SRAM 38 are to be executed. A branch instruction is used in one example embodiment to change the execution of the executable instructions of the first instruction sequence to execution of the executable instructions of the second instruction sequence.

Control unit 18 includes a program counter 30 which is configured to generate a plurality of program counter values which may be applied to ROM 36 and SRAM 38 to fetch the executable instructions in order according to the first instruction sequence or second instruction sequence, respectively. Program counter values generated to fetch executable instructions from ROM 36 may be referred to as first program counter values and program counter values generated to fetch executable instructions from SRAM 38 may be referred to as second program counter values.

In one embodiment, the control unit 18 fetches and executes instructions stored in ROM 36 following power-up of the memory system 10. The program counter 30 outputs a first program counter value to program memory 23 to fetch the first executable instruction from ROM 36 followed by the second program counter value, and so on while the executable instructions of the first instruction sequence are executed in order. The executable instructions fetched by the program counter values are applied according to the first instruction sequence via a bus 40 to a multiplexer 34 and an instruction register 32 of control unit 18 where the executable instructions are executed in order according to the first instruction sequence.

The control unit 18 may implement writing and reading operations with respect to main memory 12 during execution of the executable instructions stored in ROM 36. The portion of algorithm 22 stored in ROM 36 may be referred to as the user mode algorithm.

As shown in FIG. 2, the program counter values outputted from program counter 30 may also be applied to substitution circuitry 20 which comprises logic circuitry 19 in the illustrated example embodiment. Substitution circuitry 20 is configured to control switching of the execution by control unit 18 of the executable instructions stored in ROM 36 to execution of the executable instructions stored in SRAM 38 as a result of detection of a predefined event in one embodiment. In one example described below, the predefined event is the generation of a predefined program counter value to fetch one of the executable instructions from ROM 36.

In one embodiment, logic circuitry 19 is content-addressable memory which may be programmed with a predefined program counter value. For example, the predefined program counter value may be predefined to initiate execution of the executable instructions of the second instruction sequence at a desired point of execution of the executable instructions of the first instruction sequence corresponding to the predefined program counter value.

Substitution circuitry 20 controls a branch to begin execution of the executable instructions of the second instruction sequence of SRAM 38 as a result of the program counter 30 generating a program counter value which corresponds to the predefined program counter value during the execution of the executable instructions of the first instruction sequence.

In the described example embodiment, the logic circuitry 19 compares the received individual program counter values with the predefined program counter value. Corresponding executable instructions are fetched from ROM 36 and applied via mux 34 to instruction register 32 if the received program counter values do not match the predefined program counter value.

Upon detection of a program counter value which is received from control unit 18 matching the predefined program counter value, the logic circuitry 19 controls the execution of the executable instructions from the SRAM 38 according to the second instruction sequence in one example embodiment.

In one specific embodiment, the logic circuitry 19 outputs a match control signal 42 as a result of a received program counter value matching the predefined program counter value. The match control signal 42 is applied to multiplexer 34 which controls multiplexer 34 to select an input received via a bus 44 for application to instruction register 32 as opposed to inputs received via bus 40. Logic circuitry 19 additionally outputs a substitute executable instruction which is applied via bus 44 and multiplexer 34 to instruction register 32. The substitute executable instruction is a branch instruction (e.g., jump or call instruction) which causes the control unit 18 to begin execution of the executable instructions of the second instruction sequence in one embodiment. Accordingly, in one embodiment, the substitution circuitry 20 replaces one of the executable instructions stored in ROM 36 (i.e., the executable instruction which otherwise would have been fetched by the program counter value which matched the predefined program counter value) with the substitute executable instruction for execution by control unit 18.

In addition, the logic circuitry 19 also applies the match control signal 42 and a substitute program counter value to program counter 30 as a result of a program counter value matching the predefined program counter value. If a current program counter value does not match the predefined program counter value, then the match control signal 42 is not asserted and the current program counter value generated by the program counter 30 is applied to program memory 23. However, if the current program counter value matches the predefined program counter value, then the match control signal 42 is asserted and the substitute program counter value is applied from logic circuitry 19 to program counter 30 which outputs the substitute program counter value to program memory 23. In other words, the substitute circuitry 20 is configured to control the program counter 30 to replace one of the program counter values for fetching one of the executable instructions from ROM 36 with the substitute program counter value. The substitute program counter value identifies a memory address of SRAM 38 which includes the first executable instruction of the second instruction sequence to be fetched and executed in one embodiment. In one embodiment, the substitute program counter value is the first program counter value of the second instruction sequence.

The application of the substitute executable instruction and substitute program counter value from logic circuitry 19 to control unit 18 initiates the branch operation to the executable instructions stored in SRAM 38. Following the branching to the first executable instruction stored in SRAM 38, the program counter 30 of control unit 18 outputs additional sequential program counter values to fetch subsequent executable instructions from SRAM 38 in the order of the second instruction sequence of SRAM 38 until execution of the algorithm 22 is controlled to return to execution of the executable instructions of ROM 36 in one embodiment.

In one example arrangement, the logic circuitry 19 de-asserts the match control signal 42 during the execution of the substitute executable instruction. The de-assertion of the match control signal 42 controls multiplexer 34 to apply the executable instructions received via bus 40 from the SRAM 38 to instruction register 32 for execution by control unit 18. The de-assertion of the match control signal 42 also controls the program counter to generate the appropriate program counter values to address SRAM 38 in the order of the second instruction sequence. In one embodiment, the executable instructions of SRAM 38 may include an appropriate executable instruction to return execution by the control unit 18 to the executable instructions of ROM 36 at an appropriate moment in time following execution of the executable instructions of the second instruction sequence.

In a typical arrangement, ROM 36 is programmed in the factory during manufacture of the memory system 10. SRAM 38 may be programmed differently in different embodiments including the following examples. In one embodiment, SRAM 38 is programmed in the factory and may be utilized as a debug structure for example to validate fixes to the executable instructions stored within ROM 36. In addition, logic circuitry 19 may also be programmed by the factory with the predefined program counter value when branching from execution of instructions of ROM 36 to SRAM 38 is to occur as well as the substitute executable instruction (e.g., branch instruction) which is to initiate the branch operation.

In other embodiments, SRAM 38 and logic circuitry 19 are programmed during use of the memory system 10 after the memory system 10 has been fabricated and shipped from the factory. For example, executable instructions for the SRAM 38 and the program counter value and substitute executable instruction for logic circuitry 19 may be stored within a portion of main memory 12 and loaded into SRAM 38 during power-up of the memory system 10 during use. In another example, a user can load the executable instructions into SRAM 38 and the program counter value and substitute executable instruction for logic circuitry 19 from externally of the memory system 10 via an input 46 (e.g., external interface) during use and which are transferred to SRAM 38 and logic circuitry 19. The executable instructions loaded into SRAM 38 may replace a portion of the executable instructions of the ROM 36 or be in addition to the executable instructions of the ROM 36 in illustrative examples.

Figure 3:
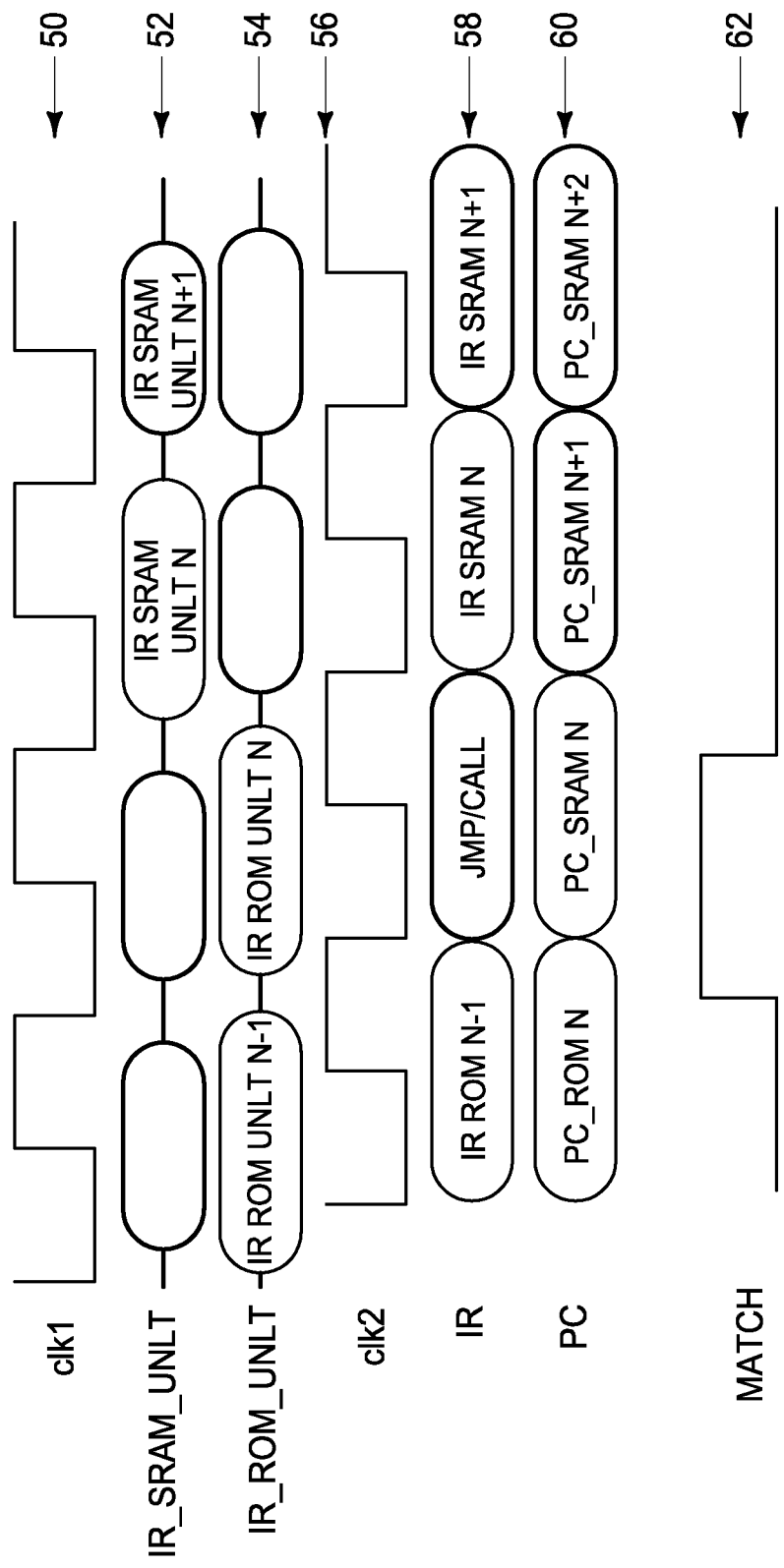
FIG. 3 is a timing diagram of operations of the control unit and program memory according to one embodiment.

Referring to FIG. 3, timing of an example branch operation is illustrated according to one embodiment where time progresses from left to right.

Line 50 of FIG. 3 corresponds to clk1 which is a clock of program memory 23 and line 56 corresponds to clk2 which is a clock of control unit 18. Line 52 is IR_SRAM_UNLT which is a not latched instruction from SRAM and line 54 is IR_ROM_UNLT which is a not latched instruction from ROM. Line 58 corresponds to latched contents of the instruction register and line 60 corresponds to program counter values which are applied to program memory to fetch executable instructions. Line 62 corresponds to the match control signal applied from the logic circuitry to the control unit.

Initially, in FIG. 3, executable instructions from the ROM are fetched and executed according to the first instruction sequence as shown by an instruction IR ROM UNLT N-1 being latched by the instruction register indicated by line 58.

In the illustrated example, the program counter value PC_ROM N which is used to fetch an instruction from the ROM matches the predefined program counter value of the substitution circuitry resulting in the assertion of the match control signal on line 62.

The assertion of the match control signal results in the substitution of the substitute executable instruction (JMP/CALL) for the executable instruction IR ROM UNLT N as indicated by the latching of the substitute executable instruction by the instruction register. In addition, the program counter outputs the substitute program counter value PC_SRAM N to the program memory as a result of the match control signal being asserted.

The application of the substitute program counter value PC_SRAM N to the program memory fetches instruction IR SRAM UNLT N from the SRAM as indicted by line 52 and which is latched in the instruction register as indicated by line 58. The execution of the algorithm continues according to the instruction sequence of the SRAM through use of program counter value PC_SRAM N+1 which fetched instruction IR SRAM UNLT N+1 and which is latched as executable instruction IR SRAM N+1. Additional program counter values may be generated and executable instructions fetched and executed during the execution of the instructions from the SRAM.

Figure 4:
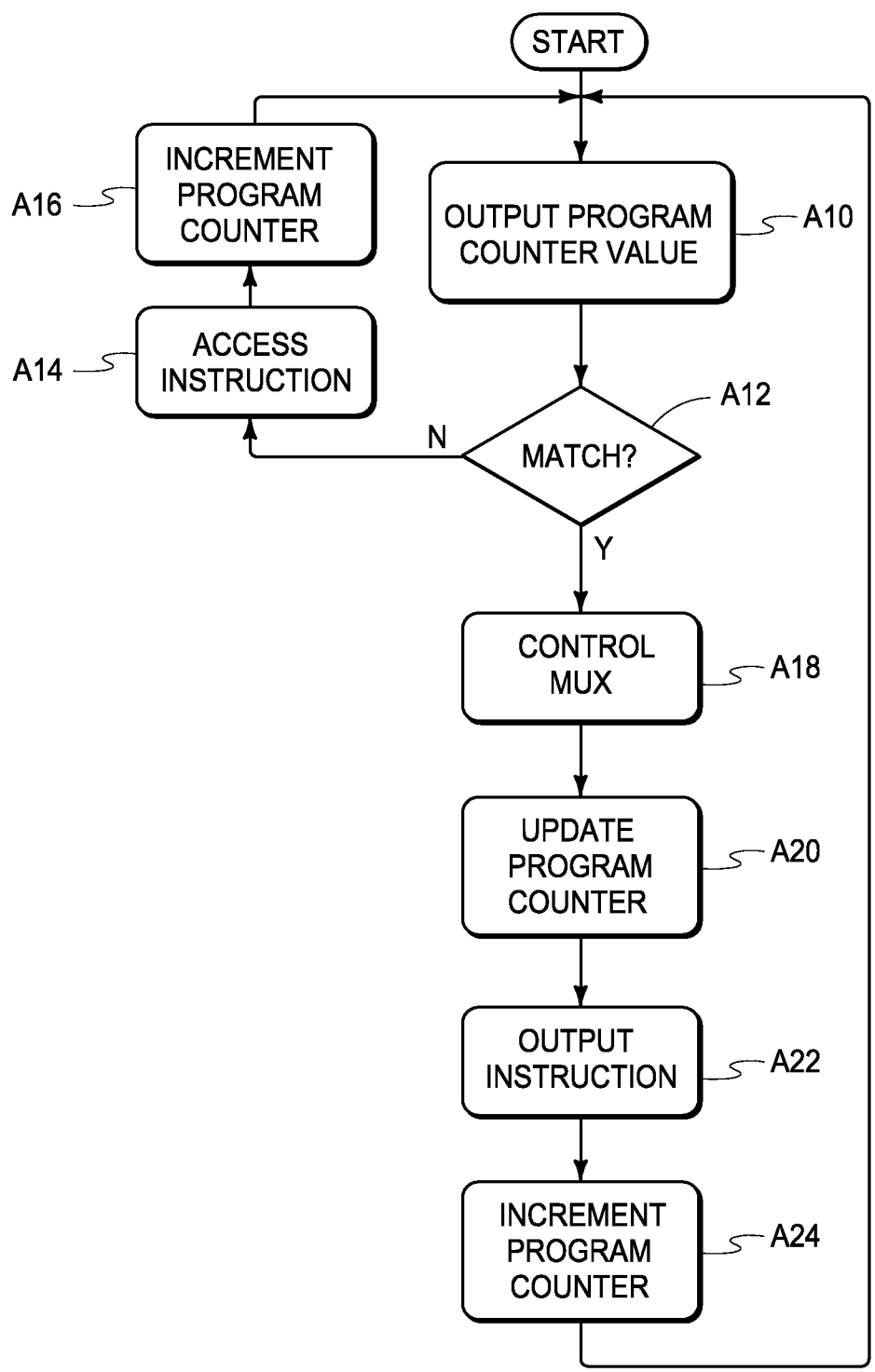
FIG. 4 is a flow chart illustrating fetch operations of the control unit according to one embodiment.

Referring to FIG. 4, example operations of fetching executable instructions from program memory are shown according to one embodiment. Other methods are possible including more, less and/or alternative acts.

At an act A10, the program counter outputs a current program counter value.

At an act A12, it is determined whether the current program counter value matches the substitute program counter value of the substitution circuitry.

If the result of act A12 is negative, the process proceeds to an act A14 to access an executable instruction from ROM.

At an act A16, the program counter is incremented and flow returns to act A10.

If the result of act A12 is affirmative, the process proceeds to an act A18 to assert a match control signal to control the multiplexer which is coupled with an input of the instruction register (shown in FIG. 2) to receive a substitute executable instruction from the substitution circuitry.

At an act A20, a substitute program counter value is applied from the substitution circuitry to the program counter of the control unit to fetch instructions from the SRAM.

At an act A22, the substitute executable instruction comprising a branch instruction in one embodiment is outputted from the substitution circuitry to the instruction register to control the control unit to branch to the executable instructions stored in SRAM.

At an act A24, the program counter is incremented from the substitute program counter value according to the instruction sequence of the SRAM to fetch subsequent executable instructions from the SRAM during subsequent executions of the illustrated flow chart.

At least some of the described example embodiments enable a user mode algorithm and a debug algorithm to be executed at the same clock speed and which utilize the same executable code. This enables analysis of the functionality of the user mode algorithm in terms of flow and timing. Furthermore, some arrangements may be used to replace portions of user mode code of the ROM with new user mode code up to the dimension of the SRAM and the SRAM provides additional space for storing executable code in debug or production operations of the memory systems. The executable code may also be updated following production of the memory systems with no compilation cost according to some embodiments described herein. In addition, incremental compilation integrates the executable instructions of the SRAM with the executable instructions of the ROM in one embodiment. The executable instructions of the SRAM are a seamless extension of the ROM in one embodiment, for example which may utilize call and jump procedures of the code of the ROM. The hierarchy of the executable code of the ROM can be modified by new procedures and incremental variables may be allocated in some embodiments.

Some conventional systems have utilized eXecute In Place (XIP) operations to update hard-coded firmware. However, these systems provide new instructions within a buffer of one plane of the memory system which precludes access to the memory cells coupled with the buffer and thereby limits the execution of the new instructions to only a portion of the memory. Furthermore, the execution speed may not match the original algorithm being modified and the new instructions may not be able to use full resources of the memory system as discussed above. Another conventional method uses a logic module to intercept and replace incorrect instructions of firmware. However, this method is limited to single line replacement and cannot be utilized to test new algorithm flows.

CONCLUSION

In some embodiments, a memory system comprises a plurality of memory cells individually configured to store data, program memory configured to store a plurality of first executable instructions which are ordered according to a first instruction sequence and a plurality of second executable instructions which are ordered according to a second instruction sequence, substitution circuitry configured to replace one of the first executable instructions with a substitute executable instruction, and a control unit configured to execute the first executable instructions to implement at least one operation with respect to the storage of the data using the memory cells, wherein the control unit is configured to execute the first executable instructions according to the first instruction sequence, to execute the substitute executable instruction after the execution of the first executable instructions, and to execute the second executable instructions according to the second instruction sequence as a result of the execution of the substitute executable instruction.

In some embodiments, a memory system comprises a plurality of memory cells individually configured to store data, a control unit configured to control reading and writing of the data with respect to the memory cells, program memory configured to store a plurality of first executable instructions which are ordered according to a first instruction sequence and to store a plurality of second executable instructions which are ordered according to a second instruction sequence, a program counter configured to generate a plurality of first program counter values to fetch the first executable instructions according to the first instruction sequence and to generate a plurality of second program counter values to fetch the second executable instructions according to the second instruction sequence, substitution circuitry configured to replace one of the first program counter values with one of the second program counter values to initiate the fetching of the second executable instructions, and wherein the control unit is configured to execute the first executable instructions to implement at least one operation with respect to the storage of the data using the memory cells.

In some embodiments, a memory system comprises a plurality of memory cells individually configured to store data, a first storage space configured to store a plurality of first executable instructions of a first instruction sequence, a second storage space configured to store a plurality of second executable instructions of a second instruction sequence, a control unit configured to execute the first executable instructions to implement at least one operation with respect to storage of the data using the memory cells, and logic circuitry configured to detect a predefined event during the execution of the first executable instructions by the control unit and to control the control unit to execute the second executable instructions as a result of the detection.

In some embodiments, a memory control method comprises first executing a plurality of first executable instructions according to a first instruction sequence to implement at least one operation with respect to storage of data using a plurality of memory cells of a memory system, during the executing of the first executable instructions, replacing one of the first executable instructions with a substitute executable instruction comprising a branch instruction configured to initiate execution of a plurality of second executable instructions, second executing the substitute executable instruction after the replacing, and third executing the second executable instructions according to a second instruction sequence as a result of the second executing.

In some embodiments, a memory control method comprises generating a plurality of program counter values, comparing the program counter values with a predefined program counter value, as a result of one of the program counter values not matching the predefined program counter value during the comparing, fetching one of a plurality of first executable instructions of a first instruction sequence using the one program counter value, executing the one first executable instruction to implement an operation with respect to storage of data using a plurality of memory cells of a memory system, as a result of another of the program counter values matching the predefined program counter value, replacing the another program counter value with a substitute program counter value, using the substitute program counter value, fetching one of a plurality of second executable instructions of a second instruction sequence, and executing the one second executable instruction.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

What is claimed is:

1. A memory system comprising:
   a main memory comprising a plurality of memory cells individually configured to store data;
   program memory configured to store a plurality of first executable instructions which are ordered according to a first instruction sequence and a plurality of second executable instructions which are ordered according to a second instruction sequence;
   substitution circuitry configured to replace one of the first executable instructions with a substitute executable instruction;
   a control unit configured to execute the first executable instructions to implement at least one operation with respect to the storage of the data using the memory cells, wherein the control unit is configured to execute the first executable instructions according to the first instruction sequence, to execute the substitute executable instruction after the execution of at least some of the first executable instructions, and to execute the second executable instructions according to the second instruction sequence as a result of the execution of the substitute executable instruction; and
   wherein some of the memory cells store the second executable instructions and the program memory receives the second executable instructions from the some memory cells.

2. The system of claim 1 further comprising a program counter configured to generate a plurality of program counter values to fetch the first and second executable instructions.

3. The system of claim 2 wherein the substitution circuitry is configured to replace the one of the first executable instructions with the substitute executable instruction as a result of the program counter generating a predefined one of the program counter values.

4. The system of claim 2 wherein the substitution circuitry is configured to control the program counter to replace one of the program counter values with a substitute program counter value as a result of the program counter generating a predefined one of the program counter values.

5. The system of claim 2 wherein the program counter values comprise a plurality of first program counter values to fetch the first executable instructions according to the first instruction sequence and wherein the substitution circuitry is configured to control the program counter to replace one of the first program counter values with one of a plurality of second program counter values to initiate fetching of the second executable instructions.

6. The system of claim 1 wherein the substitute executable instruction is a branch instruction configured to control the control unit to begin execution of the second executable instructions.

7. The system of claim 1 wherein the control unit comprises an instruction register, and wherein the substitution circuitry is configured to control provision of the substitute executable instruction to the instruction register to replace the one of the first executable instructions.

8. The system of claim 1 wherein the first executable instructions are stored in non-volatile memory of the program memory and the second executable instructions are stored in volatile memory of the program memory.

9. The system of claim 8 wherein the first and second executable instructions are stored within a continuous instruction set address space of the non-volatile memory and the volatile memory.

10. The system of claim 1 wherein the control unit is configured to test the execution of the first executable instructions during the execution of the second executable instructions.

11. The system of claim 1 wherein the control unit is configured to initiate execution of the second executable instructions according to the second instruction sequence as a result of the execution of the substitute executable instruction.

12. The system of claim 1 wherein the control unit is configured to execute the substitute executable instruction and the second executable instructions before execution of all of the first executable instructions of the first instruction sequence.

13. The system of claim 1 wherein the control unit is configured to execute the first and second executable instructions to implement operations with respect to writing and reading of the data with respect to the memory cells.

14. The system of claim 1 wherein the control unit is configured to implement the at least one operation with respect to the storage of the data using the memory cells including at least one of reading and writing the data with respect to one of the memory cells.

15. A memory system comprising:
   a plurality of memory cells individually configured to store data;
   a control unit configured to control reading and writing of the data with respect to the memory cells;
   program memory configured to store a plurality of first executable instructions which are ordered according to a first instruction sequence and to store a plurality of second executable instructions which are ordered according to a second instruction sequence;
   a program counter configured to generate a plurality of first program counter values to fetch the first executable instructions according to the first instruction sequence and to generate a plurality of second program counter values to fetch the second executable instructions according to the second instruction sequence;
   substitution circuitry configured to replace one of the first program counter values with one of the second program counter values to initiate the fetching of the second executable instructions;

wherein the control unit is configured to execute the first executable instructions to implement at least one operation with respect to the storage of the data using the memory cells; and wherein the substitution circuitry is configured to replace one of the first executable instructions with a branch instruction which is configured to control the control unit to initiate execution of the second executable instructions.

16. The system of claim 15 wherein the substitution circuitry is configured to replace the one of the first program counter values with the one of the second program counter values and to replace the one of the first executable instructions with the branch instruction as a result of the program counter generating a predefined first program counter value.

17. The system of claim 15 wherein the first executable instructions are stored in non-volatile memory and the second executable instructions are stored in volatile memory.

18. The system of claim 17 wherein the first and second executable instructions are stored within a continuous instruction set address space of the non-volatile memory and the volatile memory.

19. The system of claim 15 wherein the substitution circuitry is configured to replace the one of the first program counter values with the one of the second program counter values before execution of the branch instruction by the control unit.

20. A memory system comprising:
a plurality of memory cells individually configured to store data;
a first storage space configured to store a plurality of first executable instructions of a first instruction sequence;
a second storage space configured to store a plurality of second executable instructions of a second instruction sequence;
a control unit configured to execute the first executable instructions to implement at least one operation with respect to storage of the data using the memory cells;
logic circuitry configured to detect a predefined event during the execution of the first executable instructions by the control unit and to control the control unit to execute the second executable instructions as a result of the detection;
wherein the first storage space is non-volatile memory and the second storage space is volatile memory;
wherein the control unit comprises a program counter configured to generate a plurality of program counter values to fetch the first executable instructions;
wherein the logic circuitry is configured to detect the predefined event comprising generation of a predefined one of the program counter values; and
wherein the logic circuitry is configured to provide a substitute program counter value to the program counter to initiate fetching of the second executable instructions as a result of the detection.

21. The system of claim 20 wherein the first and second executable instructions are stored within a continuous instruction set address space of the first and second storage spaces.

22. The system of claim 20 wherein the logic circuitry is configured to provide a branch instruction to the control unit to control the control unit to initiate the execution of the second executable instructions as a result of the detection.

23. A memory control method comprising:
first executing a plurality of first executable instructions according to a first instruction sequence to implement at least one operation with respect to storage of data using a plurality of memory cells of a memory system;
during the executing of the first executable instructions, replacing one of the first executable instructions with a substitute executable instruction comprising a branch instruction configured to initiate execution of a plurality of second executable instructions;
second executing the substitute executable instruction after the replacing;
third executing the second executable instructions according to a second instruction sequence as a result of the second executing;
transferring the second executable instructions from some of the memory cells to program memory of the memory system; and
fetching the second executable instructions from the program memory.

24. The method of claim 23 further comprising generating a plurality of program counter values, and wherein the fetching comprises fetching the second executable instructions using the program counter values.

25. The method of claim 24 further comprising detecting the generation of a predefined one of the program counter values, and wherein the replacing comprises replacing as a result of the detecting.

26. The method of claim 25 further comprising replacing one of the program counter values with a substitute program counter value as a direct result of the detecting, the substitute program counter value initiating the fetching of the second executable instructions.

27. The method of claim 24 further comprising replacing one of the program counter values with a substitute program counter value, and further comprising initiating the fetching of the second executable instructions using the substitute program counter value.

28. The method of claim 23 further comprising receiving the second executable instructions from externally of the memory system and storing the second executable instructions within the some of the memory cells and the program memory.

29. The method of claim 23 further comprising storing the first executable instructions in non-volatile memory and storing the second executable instructions in volatile memory.

30. The method of claim 23 further comprising storing the first and second executable instructions within a continuous instruction set address space.

31. The method of claim 23 wherein the second executing the substitute executable instruction comprises executing prior to execution of any of the second executable instructions.

32. A memory control method comprising:
generating a plurality of program counter values;
comparing the program counter values with a predefined program counter value;
as a result of one of the program counter values not matching the predefined program counter value during the comparing, fetching one of a plurality of first executable instructions of a first instruction sequence using the one program counter value;
executing the one of the first executable instructions to implement an operation with respect to storage of data using a plurality of memory cells of a memory system;
as a direct result of another of the program counter values matching the predefined program counter value, replacing the another program counter value with a substitute program counter value and replacing another of the first executable instructions with a substitute executable instruction;

using the substitute program counter value, fetching one of a plurality of second executable instructions of a second instruction sequence; and executing the one of the second executable instructions.

33. The method of claim 32 wherein the substitute executable instruction comprises a branch instruction to begin execution of the second executable instructions.

34. The method of claim 33 wherein the one of the second executable instructions is the first instruction to be executed within the second instruction sequence following execution of the branch instruction.

35. The method of claim 32 further comprising storing the first executable instructions in non-volatile memory and storing the second executable instructions in volatile memory.

36. The method of claim 32 further comprising storing the first and second executable instructions within a continuous instruction set address space.

* * * * *